May 28, 1968  K. K. KROFFKE  3,385,166

PNEUMATIC RECIPROCATING VALVE

Filed Aug. 15, 1966

*INVENTOR.*
KENNETH K. KROFFKE
BY Whittemore, Hulbert
& Belknap

ATTORNEYS

3,385,166
PNEUMATIC RECIPROCATING VALVE
Kenneth K. Kroffke, Parma, Ohio, assignor to Airmatic Valve, Inc., Cleveland, Ohio, a corporation of Ohio
Filed Aug. 15, 1966, Ser. No. 572,410
9 Claims. (Cl. 91—306)

This invention relates to a pneumatically actuated reciprocating valve assembly and has particular reference to a reciprocating four way spool valve for controlling a reciprocating double acting pneumatic cylinder or pump. The present invention provides an improved, completely pneumatic system for shifting the spool of a four way valve for controlling the reciprocation of a double acting power cylinder, pump, or the like. Pneumatic control means are provided for controlling the time of each stroke of the power cylinder, and means may also be provided to adjust the dwell time between each stroke so that by use of the invention it is possible to independently control each portion of the cycle of operation of the power cylinder.

It is the principal object of the invention to provide a new and improved valve for automatically reciprocating a power cylinder.

A further object of the invention is to provide a control valve for a reciprocating power cylinder in which it is possible to independently vary the time of each stroke of the cylinder and the dwell time between strokes.

The foregoing, as well as other objects, will become more apparent as this description proceeds, especially when considered in connection with the accompanying drawings illustrating preferred embodiments of the invention, wherein.

Figure 2:
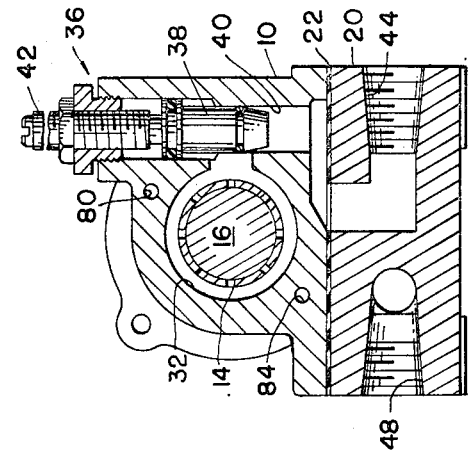
FIGURE 2 is a sectional view taken along line 2—2 of FIGURE 1.
Figure 1:
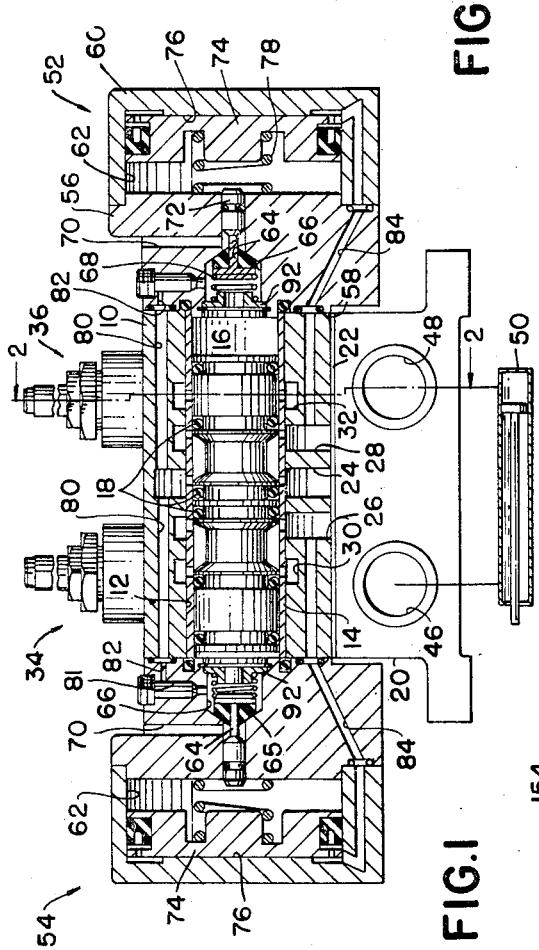
FIGURE 1 is a sectional view with parts in elevation of a valve according to the invention.

In FIGURE 1 there is illustrated a valve comprising a valve body 10 having an axial bore 12 therein lined by sleeve 14. A valve spool 16 is reciprocally confined within the sleeve 14 and is provided on its outer periphery with a series of O-rings 18 separated by portions of reduced diameter as shown. The valve body 10 may be counted on a base 20 with a gasket 22 therebetween. The valve body is provided with a pressure fluid inlet port 24, a pair of work ports 26 and 28, and a pair of exhaust ports 30 and 32, all of which communicate with the interior of the bore 12 through apertures in sleeve 14. The exhaust ports 30 and 32 communicate with flow control valves 34 and 36 respectively. Each flow control valve is provided with a metering valve member 38 which may be adjustably seated in bore 40 by a rotating stem 42 so as to meter the flow of pressure fluid passing from the respective exhaust ports 30, 32 through bore 40 to outlet 44 in base 20 of the valve. Work ports 46 and 48 in base 20 are connected to work ports 26 and 28 respectively in valve body 10 and may be connected to a power cylinder 50 by pressure lines as indicated in FIGURE 1.

Pneumatically operated valve controls 52 and 54 are mounted on opposite ends of the valve body 10. The valve controls 52 and 54 may be of identical construction and each includes a block 56 having an end wall 58 closing one end of bore 12 and a cylindrical cap 60 secured to the block 56 to define a cylindrical piston chamber 62.

Poppet 64 is normally seated by spring 68 against a valve seat 65 at the end of bore 66 in face 58 to prevent pressure fluid flow from the bore 12 to atmosphere through exhaust passage 70. When in this position, poppet stem 72 extends through the reduced portion of bore 66 and into the piston chamber 62. Piston 74 is reciprocally confined within chamber 62 and is normally positioned against the chamber end face 76 by spring 78.

Passages 80 extend from inlet port 24 to restricted orifices leading to passages 81 in blocks 56 which communicate with bores 66 so that each end of spool 16 is normally exposed to the inlet fluid pressure. Passages 84 run from work ports 26 and 28 to the ends of the adjacent piston chambers 62.

With the valve spool 16 positioned as in FIGURE 1 the inlet port 24 is connected through the right hand passage 80, restricted orifice 82, passage 81, and bore 66 to the right hand end of bore 12 through a central opening in spring retaining washer 92. Likewise, the left hand end of bore 12 is maintained at inlet pressure by pressure fluid flowing from inlet port 24 through the corresponding left hand passages so that the spool 16 is pressure balanced within the bore 12. Pressure fluid from inlet port 24 also flows through work ports 28 and 48 to extend the piston in power cylinder 50. The opposite end of cylinder 50 is exhausted through work ports 46 and 26 to exhaust port 30 and then to atmosphere through flow control valve 34. Control valve 34 is adjusted to achieve the desired rate of operation of power cylinder 50. At this time pressure fluid also flows from work port 28 through orifice 84 to the right hand chamber 62 to the right of piston 74, causing the piston to shift to the left against spring 78 and abut end 72 of poppet 64. During the stroke of power cylinder 50 the work chamber thereof is expanding so that the pressure applied against piston 74 is less than line pressure and is insufficient to unseat poppet 64. When the stroke of the power cylinder is completed the fluid pressure in the power cylinder and in chamber 62 builds up to full line pressure and the increased force exerted on piston 74 is sufficient to move it to the left to unseat the poppet 64. Because the pressure in chamber 62 is not built up to line pressure until the expansion stroke of power cylinder 50 is completed, the poppet 64 cannot be unseated until after the completion of the power cylinder stroke.

With the unseating of poppet 64, the pressure at the right hand side of spool 16 is vented to atmosphere through exhaust 70 and spool 16 is immediately shifted to the right hand end of bore 12 by the line pressure reacting on the left hand end of the spool.

With the spool shifted to the right hand end of bore 12, the work port 28 is connected to exhaust port 32 and the inlet port 24 is connected to work port 26 so that fluid pressure flows through work port 46 to the other side of power cylinder 50 to initiate the return stroke of the work piston while the other side of the power cylinder is exhausted to atmosphere through work ports 48 and 28, exhaust port 32, flow control valve 36 and outlet 44. The speed of the return stroke of cylinder 50 is determined by the setting of exhaust flow control valve 36. When the spool 16 shifts to the right, the right hand chamber 62 is also exhausted to atmosphere through passageway 84 and work port 28 so that the piston 74 is again seated against the end face 76 by spring 78 and poppet 64 is then seated against the end of bore 66 by spring 68 so that the right hand end of spool 16 is again subjected to pilot pressure from inlet 24.

With the return stroke of power cylinder 50 the left hand chamber 62 is subjected to work pressure from work port 26 through passage 84 which moves the piston 74 of valve unit 54 against the end of its poppet 64. When the return stroke of the power cylinder 50 is completed the line pressure moves left hand piston 74 to the right to unseat its poppet 64 and vent the line pressure in the left end of bore 12 to atmosphere. The line pressure in the right end of bore 12 immediately shifts the spool back to the left to the position shown in FIGURE 1 to complete the cycle of operation of the valve.

As long as pressure is maintained in inlet 24 power cylinder 50 will reciprocate with the speed of each stroke determined by the setting of the exhaust flow controls 34 and 36. It should be noted that the invention as shown in FIGURE 1 is positive acting in that the spool 16 cannot shift until after the stroke of the power cylinder 50 is completed and the pressure has built up to full line pressure in the piston chamber 62 of the appropriate valve unit 52 or 54. However, as soon as a poppet valve is opened upon completion of a work stroke, full line pressure is available to rapidly shift the spool in the opposite direction. This feature represents a marked improvement over conventional pneumatic reciprocating valves, and makes it impossible to reverse the spool before the completion of the full power cylinder work stroke. The positive action of the valve described herein assures that the power cylinder 50 is reciprocated throughout its full work stroke and eliminates possible premature movement of the spool 16.

Figure 3:
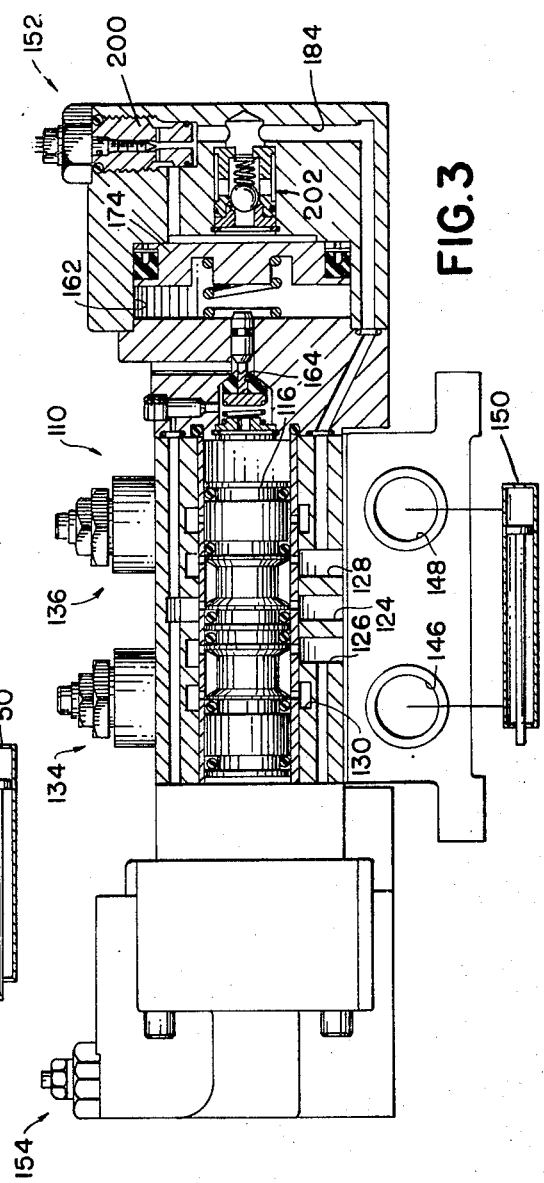
FIGURE 3 is a sectional view with parts in elevation of a modified form of the invention.

The valve 110 in FIGURE 3 is identical to that shown in FIGURE 1 with the exception that the valve controls 152 and 154 are modified to provide an adjustable dwell time following each stroke of the power cylinder 150. With the spool 116 positioned as shown in FIGURE 3, pressure fluid flows from inlet port 124 through work ports 128 and 148 to one side of the power cylinder 150 to extend the same. The other side of power cylinder 150 is exhausted to atmosphere through work ports 146 and 126, exhaust port 130, and control valve 134 as in the valve shown in FIGURE 1. Pressure fluid flows through passage 184 and is metered through adjustable needle valve 200 to that portion of piston chamber 162 to the right of piston 174. The needle valve 200 slows the build-up of pressure to the right of piston 174 so that there is a time delay from the time the stroke of power cylinder 150 is completed until pressure is built up in chamber 162 sufficient to shift piston 174 completely to the left to unseat poppet 164 and shift the spool 116.

The duration of the interval between the end of the work stroke of power cylinder 150 and the unseating of poppet 164 is determined by the setting of the needle valve 200, and may be varied over a wide range so that the dwell time at the end of the work stroke of power cylinder 150 may be varied as desired. A ball type check valve 202 connects the right hand end of piston chamber 162 with passageway 184 to provide immediate pressure relief of the chamber 162 when the piston 174 is returned to the right hand end thereof after the spool valve has shifted. Valve control 154 is similar to valve control 152 so as to obtain a dwell after the return stroke of power cylinder 150.

With the exception of the adjustable dwell time after the power strokes of the cylinder 150, the valve shown in FIGURE 3 operates similarly to the valve shown in FIGURE 1. The exhaust flow controls 134 and 136 are independently adjustable so that by properly setting needle valve 200 and the flow control valves 134 and 136 it is possible to independently adjust the timing of each stroke of the power cylinder 150 and the duration of the dwell time between each stroke.

It is also within the scope of the invention to provide a valve of the kind shown in FIGURE 1 wherein one of the valve units 52 or 54 is replaced by a valve unit like that shown in FIGURE 3 so that a dwell will be obtained at the end of one stroke of the power cylinder but not on the return stroke.

While I have illustrated and described preferred embodiments of my invention, it is understood that these are capable of modification, and I therefore do not wish to be limited to the precise details set forth but desire to avail myself of such changes and alterations as fall within the purview of the following claims.

What I claim as my invention is:

1. A pneumatically actuated reciprocating valve for alternately supplying pressure fluid to opposite ends of a power cylinder or the like, comprising a valve body having a bore therein, an inlet port and a pair of work ports communicating with said bore, a valve spool reciprocable in said bore and operable upon reciprocation thereof alternately to connect each work port with said inlet port and the other work port to exhaust, means connecting said work ports to opposite ends of the power cylinder, passage means connecting said inlet port to opposite ends of said bore to supply pressure fluid to opposite ends of said valve spool, each said passage means including a restricted orifice therein, an exhaust passage communicating with each end of said bore and a normally closed poppet valve in each said exhaust passage, pressure responsive means associated with each of said poppet valves and means connecting each work port with one of said pressure responsive means for actuating the latter, said pressure responsive means being operable upon actuation thereof to open the poppet valve associated therewith and exhaust one end of said bore thereby to permit the pressure fluid in the opposite end of said bore to shift said spool toward said one end of said bore, said pressure responsive means being operable to open their respective poppet valves only upon completion of a work stroke by the power cylinder.

2. A valve according to claim 1 wherein said pressure responsive means are operable to open their respective poppet valves upon an increase in pressure in their respective work ports.

3. A valve according to claim 2 wherein said pressure responsive means each comprise a chamber communicating with one of said work ports, a piston in said chamber engageable with said poppet valve, spring means urging said piston out of engagement with said poppet valve, said piston being shifted to open said poppet valve when the pressure supplied thereto through said one work port is greater than the pressure existing in such work port during the work stroke of said power cylinder.

4. A valve according to claim 3 including an adjustable valve means in the passage connecting one of said chambers to its work port to restrict fluid flow to such chamber thereby to provide a time delay between completion of a work stroke of said power cylinder and shifting of said valve spool.

5. A valve according to claim 4 including a by-pass passage around adjustable valve means and a check valve in said by-pass.

6. A valve according to claim 1 including adjustable valve means controlling the rate of exhaust of said power cylinder thereby regulating the speed of the work stroke thereof.

7. A pneumatically actuated reciprocating valve for alternately supplying pressure fluid to opposite ends of a power cylinder or the like, comprising a valve body having a bore therein, an inlet port, a pair of work ports and a pair of exhaust ports communicating with said bore, a valve spool reciprocable in said bore and operable upon reciprocation thereof alternately to connect each work port with said inlet port and one of said exhaust ports, means connecting said work ports to opposite ends of the power cylinder, passage means connecting said inlet port to opposite ends of said bore to supply pressure fluid to opposite ends of said valve spool, an exhaust passage communicating with each end of said bore and a normally closed valve in each said exhaust passage, pressure responsive means associated with each of said valves and means connecting each work port with one of said pressure responsive means for actuating the latter, said pressure responsive means being operable upon actuation thereof to open the valve associated therewith and exhaust one end of said bore thereby to permit the pressure fluid in the opposite end of said bore to shift said spool toward said one end of said bore, and means to prevent actuation of said pressure responsive means until completion of a work stroke by the power cylinder.

8. A valve according to claim 7 including an adjustable valve means associated with each said exhaust port to regulate the rate of exhausting of said power cylinder.

9. A valve according to claim 8 including adjustable valve means in the connections between said work ports and said pressure responsive means to restrict fluid flow to the latter thereby to provide a time delay between completion of a work stroke and shifting of said valve spool.

References Cited
UNITED STATES PATENTS

| Re. 7,420 | 12/1876 | Cameron | 91—307 |
| 335,855 | 2/1886 | Toole | 91—307 |
| 2,964,013 | 12/1960 | Mitchell et al. | 91—306 |

MARTIN P. SCHWADRON, *Primary Examiner.*

PAUL E. MASLOUSKY, *Examiner.*